United States Patent
Feder et al.

(10) Patent No.: US 11,332,582 B2
(45) Date of Patent: *May 17, 2022

(54) CROSSLINKABLE SILICONE COMPOSITION FOR THE PRODUCTION OF NON-STICK COATINGS FOR FLEXIBLE SUBSTRATES AND AN ATTACHMENT-PROMOTING ADDITIVE CONTAINED IN THIS COMPOSITION

(71) Applicant: ELKEM SILICONES FRANCE SAS, Lyons (FR)

(72) Inventors: Michel Feder, Villeurbanne (FR); John White, Letra (FR); Sébastien Marrot, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 141 days.

This patent is subject to a terminal disclaimer.

(21) Appl. No.: 15/762,614

(22) PCT Filed: Sep. 22, 2016

(86) PCT No.: PCT/FR2016/000145
§ 371 (c)(1),
(2) Date: Mar. 23, 2018

(87) PCT Pub. No.: WO2017/051084
PCT Pub. Date: Mar. 30, 2017

(65) Prior Publication Data
US 2018/0265641 A1    Sep. 20, 2018

(30) Foreign Application Priority Data
Sep. 25, 2015  (FR) ..................... 1501991

(51) Int. Cl.
| | | |
|---|---|---|
| *C08G 77/12* | (2006.01) | |
| *C08G 77/14* | (2006.01) | |
| *C09D 183/04* | (2006.01) | |
| *C09D 183/06* | (2006.01) | |
| *C08G 77/38* | (2006.01) | |
| *B05D 3/02* | (2006.01) | |
| *C08G 77/20* | (2006.01) | |

(52) U.S. Cl.
CPC ........... *C08G 77/38* (2013.01); *B05D 3/0254* (2013.01); *C09D 183/04* (2013.01); *C09D 183/06* (2013.01); *C08G 77/12* (2013.01); *C08G 77/20* (2013.01)

(58) Field of Classification Search
None
See application file for complete search history.

(56) References Cited

U.S. PATENT DOCUMENTS

| | | | | |
|---|---|---|---|---|
| 5,529,837 A | * | 6/1996 | Fujiki | B60R 21/235 280/728.1 |
| 2007/0197742 A1 | | 8/2007 | Naoki | |
| 2009/0246499 A1 | * | 10/2009 | Katsoulis | C09D 183/04 428/220 |
| 2013/0190470 A1 | * | 7/2013 | Marrot | C08G 77/38 528/27 |

FOREIGN PATENT DOCUMENTS

| | | | | |
|---|---|---|---|---|
| CN | 108676134 B | * | 10/2020 | |
| JP | 07118537 | * | 5/1995 | C08G 77/20 |

OTHER PUBLICATIONS

English machine translation of JP07-118537 (1995).*
English machine translation CN-108676134-B 2020.*
PCT International Search Report for PCT/FR2016/000145, dated Nov. 22, 2016.

* cited by examiner

*Primary Examiner* — Kenneth J Stachel
(74) *Attorney, Agent, or Firm* — McBee Moore & Vanik IP, LLC; Susan McBee; Chester Moore

(57) ABSTRACT

Crosslinkable or crosslinked silicone compositions that can be used, in particular, to form a non-stick and water-repellent coating or film for flexible substrates and in the form of natural or synthetic polymer films are provided. These compositions comprise crosslinking organopolysiloxanes bearing SiH units and unsaturated organopolysiloxanes, preferably vinyl organopolysiloxanes, capable of reacting with the crosslinker by addition reaction, in the presence of platinum in order to form the non-stick crosslinked coating on the flexible substrate, and at least one crosslinking and attachment-promoting additive X. These compositions are advantageously free of solvent and can be crosslinked instantaneously into a non-stick and/or water-repellent coating for a flexible substrate.

8 Claims, No Drawings

CROSSLINKABLE SILICONE COMPOSITION FOR THE PRODUCTION OF NON-STICK COATINGS FOR FLEXIBLE SUBSTRATES AND AN ATTACHMENT-PROMOTING ADDITIVE CONTAINED IN THIS COMPOSITION

CROSS-REFERENCE TO RELATED APPLICATIONS

This application is a National Stage entry of International Application No. PCT/FR2016/000145, filed Sep. 22, 2016, which claims priority to French Patent Application No. 1501991, filed Sep. 25, 2015.

BACKGROUND

The field of the invention is that of crosslinkable or crosslinked silicone compositions that can be used in particular to form a water-repellent release coating or film for flexible supports, for example made of paper or the like, and in the form of natural or synthetic polymer films.

DESCRIPTION OF RELATED ART

These curable silicone release compositions are applied to such supports so as to facilitate the removal of adhesive materials that are reversibly laminated on these supports.

These liquid silicone compositions are applied to the support films in industrial coating devices comprising rolls operating at very high speed (for example 600 m/min). It is clear that, in these coating procedures at very high speed, the viscosity of the liquid silicone coating composition must be meticulously adjusted to the coating operating conditions.

In practice, the rate of deposition of the release silicone is between 0.1 and 2 and preferably between 0.3 and 1 $g/m^2$, which corresponds to thicknesses of the order of a micrometer.

Once applied to the flexible support, the silicone composition crosslinks to form a solid water-repellent and/or release silicone coating (e.g. elastomer).

Given the industrial rates of coating at very high speed, the crosslinking kinetics must be extremely rapid in order to result in correct crosslinking, that is to say that the silicone release films must be sufficiently crosslinked to be able to perform their release function as well as possible and to have the desirable mechanical qualities. The assessment of the quality of the crosslinking of the silicone release coating can in particular be carried out through the assaying of the non-crosslinked extractable compounds, the amount of which must be as low as possible. For example, the amount of extractable compounds is preferably less than 5%, under normal industrial crosslinking conditions.

The nonadhesion of the free external face of the silicone coating is expressed through the release force, which must be weak and controlled, for the element intended to be placed on the support coated with the silicone release film. Conventionally, this element may be the adhesive face of a label or of a tape of the same kind.

Thus, in addition to this weak and controlled nonadhesion, the adhesion of the silicone coating on its support must be very high. This adhesion property is assessed for example using the rub-off trade test, which consists in rubbing the surface of the coating with a finger and in measuring the number of successive passes before there is damage to the coating.

It is also important for these silicone coating compositions, that can be crosslinked by hydrosilylation, e.g. Si—H/Si-Vi, to have the longest possible lifetime at ambient temperature, when they are in the form of a coating bath in industrial coating machines.

The flexible supports coated with a silicone release film may be, for example:
a paper or a polymer film of the polyolefin (polyvinyl chloride (PVC), polypropylene or polyethylene) type or of polyester (polyethylene terephthalate or PET) type;
an adhesive tape, the internal face of which is coated with a layer of pressure-sensitive adhesive and the external face of which comprises the silicone release coating;
or a polymer film for protecting the adhesive face of a self-adhesive or pressure-sensitive adhesive element.

For obvious handling safety and toxicity reasons, the present invention is directed toward silicone compositions that are advantageously solvent-free.

Beyond this aspect, it is preferable, from an expenditure point of view, for it to be possible for these advantageously solvent-free silicone coating compositions to be used on standard industrial coating equipment suitable for flexible paper supports. This assumes that said compositions have a relatively low viscosity (for example less than or equal to 1000 mPa·s) in order to facilitate the handling thereof, to have a good coating quality and to reduce the "misting" problem which appears at the very high industrial coating speeds.

Another constraint to be taken into account for the formulation of the liquid silicone coating compositions is that the coefficient of friction of the crosslinked silicone elastomer coating must be controllable, so as to facilitate the operations of rolling up/unrolling the flexible supports made of polymer (in particular of polyester such as PET), which are useful as liners for labels.

It is important for this application that the elastomeric silicone coating is not detrimental to the smooth appearance or to the transparency or to the mechanical properties of the support. The smooth appearance and the mechanical properties are required for precision stripping at very high speed. The transparency is desirable for inspection of the evenness of the film at very high speed, using optical detectors.

In a release coating, it is important to control the release force. Advantageously, this control must be effective at low speed and at high speed. The equilibrium between the low-speed release forces and the high-speed release forces is commonly referred to as the release profile.

Beyond the properties mentioned above, for all supports, the adhesion or the attachment of the silicone coating on the support, measured by the abrasion resistance, should first and foremost be optimal and long-lasting, even in the presence of the adhesive of the label.

In point of fact, in the context of the invention, interest is focused more especially on the kinetics of crosslinking of the silicone coating composition and also on the optimization of the adhesion or attachment of the silicone coating on the support, even when it is subjected to high temperature and humidity conditions, for example 50° C. and 70% relative humidity.

Application EP 1 594 693 describes silicone release compositions having an improved adhesion on paper or polymer supports and comprising, as attachment-promoting additives, organopolysiloxanes bearing at least one epoxy unit or a carboxylic acid anhydride unit and at least one SiH unit. Patent application EP 2 563 870 describes attachment-promoting additives comprising epoxy functional units and SiH units, characterized by an epoxy unit content of less than or equal to 100 mmol/g of attachment additive.

SUMMARY

It has now been found that the use, as attachment additives, of linear organopolysiloxanes where all of the siloxyl units present in the chain bear either epoxy units or SiH units allow optimal attachment of the silicone coating on the support with an increased stability over time, this being so even in the presence of the adhesive of the label.

In this context, an essential objective of the present invention is to provide novel liquid silicone coating compositions which are advantageously solvent-free and which can be instantaneously crosslinked into a release and/or water-repellent coating for a flexible support and which result in crosslinked silicone coatings of very good quality, in particular in terms of attachment/adhesion on the support and of release profile, with very good stability over time.

Another essential objective of the invention is to provide novel liquid silicone coating compositions to which has been added an improved attachment promoter, which is advantageously solvent-free, which rapidly crosslink into a release and/or water-repellent coating for flexible supports, such as papers or polymer films of the polyolefin (polyvinyl chloride (PVC), polypropylene or polyethylene) type or of polyester (polyethylene terephthalate—PET-) type and wherein the catalyst concentration can be reduced.

Another essential objective of the invention is to provide novel liquid silicone coating compositions to which has been added an improved attachment promoter, which make it possible to prepare a crosslinked coating on a flexible support having:
- on the one hand, sufficient crosslinking to have suitable mechanical and adhesion properties of the coating,
- and, on the other hand, a low amount of extractable compounds for good persistence of the release properties that is in particular favorable for the preparation and the use of the adhesive labels derived from these complexes.

Another essential objective of the invention is to provide novel liquid silicone coating compositions to which has been added an improved attachment promoter, which is advantageously solvent-free, which can be crosslinked into a release and/or water-repellent coating for flexible supports, this crosslinking being carried out rapidly at moderate temperature, these compositions having, moreover, long lifetimes in a bath, at ambient temperature.

Another essential objective of the invention is to provide novel liquid silicone coating compositions to which has been added an improved attachment promoter, which can be crosslinked into a release and/or water-repellent coating for a flexible support, which are easy to prepare and which are inexpensive.

Another essential objective of the invention is to provide a novel process for producing a water-repellent release coating on a flexible support (for example a paper or a polymer), having, more especially, improved attachment properties by virtue of an attachment-promoting additive, while at the same time meeting moreover the requirements of control of the release force profile, of a low amount of extractable compounds and of an appropriate coefficient of friction, all this with an advantageously solvent-free starting composition having a viscosity that is compatible with high-speed coating without misting.

Another essential objective of the invention is to provide a novel process for increasing the attachment (i.e. the abrasion resistance) of a crosslinked/cured water-repellent silicone release coating, applied to any support (e.g. paper or polymer), and obtained from a silicone composition that can be crosslinked/cured by polyaddition and that comprises an improved and effective adhesion-promoting additive.

Another essential objective of the invention is to provide a novel flexible support (e.g. paper or polymer), having at least one water-repellent release coating, based on a silicone composition crosslinked/cured by polyaddition, and having excellent properties of attachment, of release force profile control, of hardness (% extractable compounds) and of suitable coefficient of friction, all this starting from an advantageously solvent-free starting composition which has a viscosity compatible with high-speed coating without misting.

These objectives, among others, are achieved by the present invention which relates firstly to a silicone composition A comprising a silicone base B capable of crosslinking or curing by polyaddition and characterized in that it comprises at least one additive X which is a linear organopolysiloxane comprising siloxyl units (I.1) to (I.3) having the formulae below:

   (I.1)

   (I.2)

   (I.3)

and not comprising units of formula (I.4):

   (I.4)

in which
- a=1 and b=1 or 2
- d=1 and e=1 or 2
- the symbol Y represents a radical comprising a hydrocarbon-based group having from 2 to 20 carbon atoms and an epoxy function, with optionally one or more heteroatoms such as an oxygen atom, preferably the symbol Y is chosen from the radicals consisting of the group: alkyl glycidyl ether, linear, branched or cyclic epoxyalkyl, linear, branched or cyclic epoxyalkenyl and carboxylic acid glycidyl ester,
- the symbols $Z^1$, $Z^2$ and $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing from 6 to 12 carbon atoms, and even more preferentially chosen from the group consisting of a methyl, ethyl, propyl, 3,3,3-trifluoropropyl, xylyl, tolyl and phenyl group, with the following conditions:
- the additive X comprises, per molecule, at least two siloxyl units (I.1) bearing epoxyfunctional hydrocarbon-based groups, at least three siloxyl units (I.3) bearing hydrosiloxyl groups and a total number N of siloxyl units of between 7 and 30 and
- the additive X has a content of siloxyl units (I.1) of greater than or equal to 0.2 mol per 100 g of additive X.

DETAILED DESCRIPTION OF A PREFERRED EMBODIMENT

It is to the inventors' credit to have developed a crosslinking and attachment-promoting additive X which is a linear organopolysiloxane of which all the siloxyl units in the chain are functionalized either with an Si—H unit (I-3) or with an Si epoxy unit (I-1) and of which the total number N of siloxyl units is between 7 and 30.

By virtue of this novel additive X, the attachment of the silicone coating on the flexible support is improved, with excellent maintaining of the attachment over time, this being so even in the presence of the adhesive of the label.

Preferably, the additive X does not contain alkoxy, vinyl, hydroxyl or methacryloxy functional groups.

It should be noted that the properties of attachment on a support are all the more positive since they endure for a long time, from a few weeks to several months, under severe humidity and temperature conditions. This durability is all the more notable since it is also observed when the release coating is in contact with the adhesive, in particular when the latter is an acrylic.

One advantage of the use of an attachment and crosslinking additive X in the composition A according to the invention is that it makes it possible to obtain a flexible support (e.g. paper or polymer) comprising at least one water-repellent release coating having an excellent abrasion resistance after at least 21 days of storage at 50° C. and at 70% relative humidity. This excellent abrasion resistance of the silicone coating on the flexible support has been verified after 160 days of storage at 50° C. and at 70% relative humidity.

Another advantage of the use of an attachment and crosslinking additive X according to the invention is that it exhibits excellent reactivity and that it improves the crosslinking kinetics of the composition A. Consequently, the amount of catalyst used in the composition A can be reduced while at the same time maintaining good reactivity and good attachment of the silicone coating on the support.

In accordance with a preferred arrangement of the invention, in the additive X, the molar ratio between the siloxyl units (I.1) and the siloxyl units (I.3) is between 0.5 and 4, preferably between 0.8 and 3.5 and even more preferentially between 1 and 3.5.

According to one preferential embodiment, the additive X consists of siloxyl units chosen from the siloxyl units (I.1) to (I.3) having the formulae below:

  (I.1)

  (I.2)

  (I.3)

in which
a=1 and b=1 or 2,
d=1 and e=1 or 2, and
the symbols Y, $Z^1$, $Z^2$ and $Z^3$ are as defined above.

According to another preferential embodiment, the additive X consists of siloxyl units chosen from the siloxyl units (I.1) to (I.3) having the formulae below:

  (I.1)

  (I.2)

  (I.3)

in which
a=1 and b=1 or 2,
d=1 and e=1, and
the symbols Y, $Z^1$, $Z^2$ and $Z^3$ are as defined above.

The additive X can be obtained by hydrosilylation of organic synthons, comprising at least one hydrocarbon-based ring in which is included an oxygen atom, by a linear organopolyhydrosiloxane not comprising units (I.4) as described previously. These hydrosilylation reactions can be catalyzed by platinum, in particular by carbon-supported platinum as described in patent EP 0 904 315 or by complexes of platinum with carbene ligands as described in patent EP 1 309 647. Preferably, the catalyst used will be a complex of platinum with carbene ligands since the hydrosilylation reaction is controlled better and the storage stability of the additive X obtained is improved.

Preferably, the additive X has a content of siloxyl units (I.1) of between 0.20 and 0.45 mol/100 g of additive X.

Even more advantageously, the additive X has a content of siloxyl units (I.1) of greater than or equal to 0.2 mol per 100 g of additive X and a content of siloxyl units (I.3) of greater than or equal to 0.3 mol per 100 g of additive X.

According to an even more advantageous embodiment, the additive X has a content of siloxyl units (I.1) of between 0.20 and 0.45 mol/100 g of additive X and a content of siloxyl units (I.3) of between 0.3 and 0.85 mol/100 g of additive X.

This additive also has the advantage of prolonged storage, in a non-gelled liquid state, suitable for use in a composition to be deposited on a support so as to form a release coating.

By virtue of the invention, the coatings obtained not only have an excellent attachment ("rub-off"), but also have a sufficiently high release force at high speed and good mechanical and physical properties (smooth appearance, transparency and good coefficient of friction).

The performances achieved by virtue of the invention in terms of quality of the crosslinking by polyaddition: reactivity/level of crosslinking/kinetics, are entirely advantageous, as attested to by the low amounts of extractable compounds obtained, with regard to the reactivity and the level of crosslinking.

The coating obtained is particularly adhesive on the support, makes it possible to provide the release property with respect to adhesives of pressure-sensitive adhesive type, and has excellent mechanical strength on prolonged contact with these adhesives, including acrylic adhesives.

These advantageous characteristics are particularly exploitable for producing the release by flexible supports, for example paper or polymer supports, that are useful, for example, as liners of self-adhesive labels (pressure-sensitive adhesive), provided in the form of rolls or spools of films e.g. manufactured at very high speed.

This is all the more advantageous since these results are obtained with a silicone composition, of which the rheological behavior is not affected (not too viscous), so that it is perfectly suitable for being coated onto any support and in particular onto any flexible support, and that it is barely or not at all subject to misting under industrial coating conditions.

In addition, the silicone coating compositions according to the invention may advantageously be "solvent-free". This means that they are free of solvent and, in particular, free of organic solvent. It is easy to see the advantages that this provides as regards health and safety.

According to one preferred embodiment, the additive X has a number N1 of siloxyl units (I.1) and a number N3 of siloxyl units (I.3) which satisfy the following conditions:
2≤N1≤10 and preferably 3≤N1≤7, and
3≤N3≤20 and preferably 5≤N3≤20.

It is particularly advantageous to use an additive X which has a total number N of siloxyl units of between 7 and 25, limits inclusive, and even more preferentially between 7 and 15.

Preferably, the additive X has a dynamic viscosity at 25° C. of between 10 and 700 mPa·s and preferably between 15 and 300 mPa·s.

From a quantitative point of view, it is advantageous for the content of crosslinking and attachment-promoting additive X to be between 0.3% and 10% by weight relative to the total weight of the composition A, preferably between 0.3% and 7%.

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

Preferably, for the siloxyl unit (I.1), Y is chosen from the group consisting of the groups (R-1) to (R-6) having the formulae below:

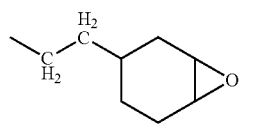
(R-1)

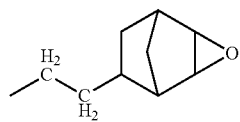
(R-2)

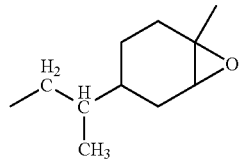
(R-3)

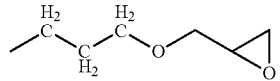
(R-4)

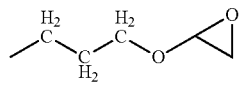
(R-5)

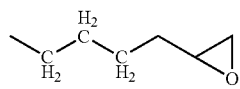
(R-6)

According to one particularly preferred embodiment, in the siloxyl unit (I.1), Y is the group (R-4) having the formula below:

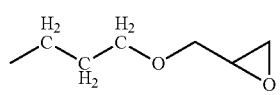
(R-4)

Throughout the present document, reference will be made to elements of standard nomenclature to denote the siloxyl units M, D, T and Q of the organopolysiloxanes. By way of reference work, mention may be made of: NOLL "*Chemistry and Technology of Silicones*", chapter 1.1, pages 1-9, Academic Press, 1968—2nd edition.

Preferably, the silicone base B comprises:
(A) at least one alkenylated organopolysiloxane E comprising at least two siloxyl units (I.5) having the formula below:

(I.5)

in which:
a=1 or 2, b=0, 1 or 2 and a+b=1, 2 or 3;
W independently represents an alkenyl group, preferably having from 2 to 6 carbon atoms, and even more preferentially a vinyl or allyl group, and
Z independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical;
(B) optionally at least one crosslinking silicone oil D comprising, per molecule, at least three hydrogen atoms bonded to the silicon;
(C) at least one polyaddition catalyst F, preferably a compound of at least one metal belonging to the platinum group;
(D) optionally at least one crosslinking inhibitor G;
(E) optionally an adhesion modulator system H;
(F) optionally at least one diluent I;
(G) optionally at least one anti-misting additive J;
(H) optionally at least one organopolysiloxane resin K, and
(I) optionally at least one non-functionalized organopolysiloxane L consisting of the siloxyl units (I.6) of formula:

(I.6)

in which:
a=0, 1, 2 or 3,
$Z^1$ independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical.

According to another embodiment of the invention, the silicone base B comprises:
(A) at least one alkenylated organopolysiloxane E comprising at least two siloxyl units (I.5) having the formula below:

(I.5)

in which:
a=1 or 2, b=0, 1 or 2 and a+b=1, 2 or 3;
W independently represents an alkenyl group, preferably having from 2 to 6 carbon atoms, and even more preferentially a vinyl or allyl group, and Z independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical;

(B) at least one crosslinking silicone oil D comprising, per molecule, at least three hydrogen atoms bonded to the silicon;

(C) at least one polyaddition catalyst F, preferably a compound of at least one metal belonging to the platinum group;

(D) optionally at least one crosslinking inhibitor G;

(E) optionally an adhesion modulator system H;

(F) optionally at least one diluent I;

(G) optionally at least one anti-misting additive J;

(H) optionally at least one organopolysiloxane resin K, and (I) optionally at least one non-functionalized organopolysiloxane L consisting of the siloxyl units (I.6) of formula:

(I.6)

in which:
a=0, 1, 2 or 3,
$Z^1$ independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical.

The crosslinking silicone oil D is preferably an organopolysiloxane comprising siloxyl units of formulae (I.7) and optionally (I.8) below:

(I.7)

(I.8)

in which:
a=1 or 2, b=0, 1 or 2 and a+b=1, 2 or 3,
H represents a hydrogen atom,
$L^1$ independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical, and
c=0, 1, 2 or 3,
$Z^1$ independently represents a monovalent hydrocarbon-based group containing from 1 to 30 carbon atoms, preferably chosen from the group formed by alkyl groups containing from 1 to 8 carbon atoms inclusive and aryl groups, and even more preferentially chosen from the group formed by a methyl, ethyl, propyl, 3,3,3-trifluoropropyl, xylyl, tolyl and phenyl radical.

The dynamic viscosity of the crosslinking silicone oil D is greater than or equal to 5, preferably greater than or equal to 10 and even more preferentially is between 20 and 1000 mPa·s.

The crosslinking silicone oil D can have a linear, branched, or cyclic structure. The degree of polymerization is greater than or equal to 2. More generally, it is less than 5000.

Examples of hydrosiloxyl units of formula (I.7) are:
M': $H(CH_3)_2SiO_{1/2}$,
D': $HCH_3SiO_{2/2}$, and
D' with phenylated group: $H(C_6H_5)SiO_{2/2}$.

Examples of crosslinking silicone oil D are:
$M_2'D_xDy'$: dimethylpolysiloxanes comprising hydrodimethylsilyl end groups, poly(dimethylsiloxane) (methylhydrosiloxy) α,ω-dimethylhydrosiloxane,
$M_2'D_xDy'$: copolymers comprising dimethylhydromethylpolysiloxane (dimethyl) units comprising trimethylsilyl end groups,
$M_2'D_xDy'$: copolymers comprising dimethylhydromethylpolysiloxane units comprising hydrodimethylsilyl end groups,
$M_2Dx'$: hydromethylpolysiloxanes comprising trimethylsilyl end groups,
$D'_4$: cyclic hydromethylpolysiloxanes, with x and y being integers or decimals (mean value) which vary according to the structure used, determined according to the usual techniques of the technical field.

It is advantageous for the alkenylated organopolysiloxane E to have a viscosity at 25° C. at least equal to 10 mPa·s, preferably of between 50 and 1000 mPa·s.

The alkenylated organopolysiloxane E can have a linear, branched or cyclic structure. Its degree of polymerization is preferably between 2 and 5000. Examples of siloxyl units of formula (I.5) are the vinyldimethylsiloxane unit, the vinylphenylmethylsiloxane unit and the vinylsiloxane unit.

Examples of organopolysiloxanes E are dimethylpolysiloxanes comprising dimethylvinylsilyl end groups, methylvinyldimethylpolysiloxane copolymers comprising trimethylsilyl end groups, methylvinyldimethylpolysiloxane copolymers comprising dimethylvinylsilyl end groups, and cyclic methylvinylpolysiloxanes.

The polyaddition catalysts F are also well known. The compounds of platinum and of rhodium are preferably used. Use may in particular be made of the complexes of platinum and of an organic product described in U.S. Pat. Nos. 3,159,601, 3,159,602 and 3,220,972 and European patents EP-A-0 057 459, EP-A-0 188 978 and EP-A-0 190 530, and the complexes of platinum and of vinyl organosiloxanes described in U.S. Pat. Nos. 3,419,593, 3,715,334, 3,377,432 and 3,814,730. The catalyst F generally preferred is platinum. In this case, the weight amount of catalyst F, calculated by weight of platinum metal, is generally between 2 and 400 ppm, preferably between 5 and 200 ppm, based on the total weight of the composition A.

One of the advantages of the composition according to the invention is that a small amount of catalyst of platinum type can be used. Thus, advantageously, the platinum metal content of the composition A is between 10 and 120 ppm, preferentially between 10 and 95 ppm, more preferentially between 10 and 70 ppm and even more preferentially between 10 and 45 ppm by weight based on the total weight of the composition A.

According to one particular embodiment, the amounts of the constituents are such that the [≡SiH]/[≡SiAlkenyl] molar ratio is between 1 and 7 and preferably between 1 and 5 with:

[≡SiH]=total number of moles of siloxyl units comprising a hydrogen atom bonded to the silicon, and

[≡SiAlkenyl]=total number of moles of siloxyl units comprising an alkenyl radical bonded to the silicon.

The crosslinking inhibitor G (or addition reaction retarder) can, for its part, be chosen from the following compounds:

an organopolysiloxane, which is advantageously cyclic, and substituted with at least one alkenyl, tetramethylvinyltetrasiloxane being particularly preferred, pyridine, organic phosphines and phosphites, unsaturated amides, alkyl maleates, and acetylenic alcohols.

These acetylenic alcohols (cf. FR-B-1 528 464 and FR-A-2 372 874), which are among the preferred hydrosilylation reaction thermal blockers, have the formula:

(R$^1$)(R$^2$)C(OH)—C≡CH in which formula:

R$^1$ is a linear or branched alkyl radical or a phenyl radical;

R$^2$ is a hydrogen atom, a linear or branched alkyl radical or a phenyl radical;

the radicals R$^1$ and R$^2$ and the carbon atom located in a of the triple bond possibly optionally forming a ring; and the total number of carbon atoms contained in R$^1$ and R$^2$ being at least 5, preferably from 9 to 20.

Said alcohols are preferably chosen from those having a boiling point above 250° C. By way of examples, mention may be made of:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol;

3-methyl-1-pentadecyn-3-ol.

These α-acetylenic alcohols are commercial products.

Such a crosslinking inhibitor is present in a proportion of at most 3000 ppm, preferably in a proportion of from 100 to 2000 ppm, relative to the total weight of the composition A.

The adhesion modulator system H is selected from known systems. It may be those described in French patent FR-B-2 450 642, U.S. Pat. No. 3,772,247 or European patent application EP-A-0 601 938. By way of examples, mention may be made of the modulators based on:

from 96 to 85 parts by weight of at least one organopolysiloxane resin (A) of type: MD$^{Vi}$Q, MM$^{Vi}$Q, MD$^{Vi}$T, M[M$^{Hexenyl}$]Q, or M[M$^{Allyloxypropyl}$]Q, from 4 to 15 parts by weight of at least one resin (B) of type: MD'Q, MDD'Q, MDT', MQ, or MDQ with T': HSiO$_{3/2}$, D': H(CH$_3$)SiO$_{2/2}$, M: (CH$_3$)$_3$SiO$_{1/2}$, Q: SiO$_{4/2}$, D: (CH$_3$)$_2$SiO$_{2/2}$, D$^{Vi}$: (CH$_3$)(Vinyl)SiO$_{2/2}$, M: (CH$_3$)$_3$SiO$_{1/2}$, M$^{Vi}$: (CH$_3$)$_2$(Vinyl)SiO$_{1/2}$, M$^{Hexenyl}$: (CH$_3$)$_2$(hexenyl)SiO$_{1/2}$.

The composition can also include another attachment-promoting additive. Said additive is preferably chosen from the epoxy-functional silanes, preferably from the group comprising:

(3,4-epoxycyclohexyl)ethyltriethoxysilane [Coatosil® 1770], tris(3-(trimethoxysilyl)propyl)isocyanurate [A-Link 597], (gamma-glycidoxypropyl)trimethoxysilane [Dynasilan® GLYMO], (gamma-methacryloxypropyl)trimethoxysilane [Dynasilan® MEMO], silicone compounds comprising both SiVi groups and epoxy functional groups, and mixtures thereof.

The concentrations suitable for this other attachment-promoting additive are, for example, between 0.5% and 5%, preferably between 1% and 3% by weight relative to the total weight of the composition A.

The diluent I optionally present in the composition is advantageously chosen from α-olefins, in particular those comprising from 4 to 15 carbon atoms per molecule.

Other functional additives can be incorporated into the composition. These additives can be chosen from fillers, for instance glass microbeads, or anti-misting agents J that are well known in the technical field.

The composition A according to the invention can also comprise at least one photoinitiator (e.g. cationic), preferably chosen from onium borates, more preferentially from iodonium borates and/or boranes.

By way of example of a photoinitiator, mention may be made of the one which corresponds to the formula:

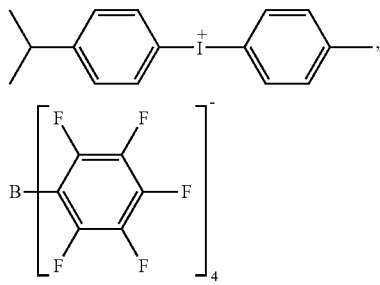

For further details regarding suitable onium borates, reference will for example be made to the following patent applications or patents: U.S. Pat. Nos. 6,864,311; 6,291,540; 5,468,902.

The photoinitiator is advantageously diluted in a protic solvent, for example isopropyl alcohol. The degree of dilution is for example between 10% and 30%, in particular equal to 20%+/−2%.

In the case where the composition comprises a photoinitiator, the coating can be subjected to a thermal and/or actinic exposure, for example UV exposure, in order to accelerate the reaction.

For further details regarding suitable boranes, reference will for example be made to the following patent applications or patents: U.S. Pat. No. 6,743,883; US-A-2004-0048975.

The preparation of the silicone composition according to the invention, that could be used in particular as a coating base for producing water-repellent release coatings, this composition being of the type of that defined above, consists simply in mixing the constituents according to the invention using mixing means and methods known to those skilled in the art.

These compositions can also optionally be used for the treatment of paper supports, in order to provide release properties and with an improved resistance of the silicone coating with respect to aggressive adhesives (for example certain acrylic pressure-sensitive adhesives: "PSAs").

Another subject of the invention relates to a silicone elastomer that can be obtained by crosslinking and/or curing the silicone composition A according to the invention and as described above.

According to another of its aspects, the invention relates to a process for producing a water-repellent release coating on a support, preferably a polymer film, more preferentially a polyester polymer film, characterized in that it consists in applying, on this support, at least one layer of a silicone composition as defined above, and in making sure that this layer crosslinks, preferably by heat-activating it.

The silicone composition A according to the invention can be deposited on flexible paper or polymer supports. For example, as flexible support, mention may be made of: polymer films such as polyolefins (e.g. polyethylene, polypropylene, etc.), polyesters (e.g. PET, etc.), papers of various types (supercalendered, coated, etc.), cardboards, cellulose sheets or metal sheets. The flexible polyester supports for example of the PET type, coated with a silicone release layer, are used as liners for adhesive labels.

The mixing means and methods are known to those skilled in the art, whether solvent-free or emulsion compositions are involved.

These compositions can be applied by means of devices used on industrial machines for coating paper, such as a five-roll coating head, air knife systems or equalizing bar systems, to flexible supports or materials, and then cured by moving through tunnel ovens heated to a temperature of between 70 and 200° C. The time required to pass through these ovens depends on the temperature. It is generally about 5 to 15 seconds at a temperature of about 100° C. and about 1.5 to 3 seconds at a temperature of about 180° C.

According to the invention, for the crosslinking of the coating, the support coated with the silicone polyaddition composition is placed at a temperature preferably of less than or equal to 180° C. for less than 10 seconds.

Said compositions can be deposited on any flexible material or substrate, such as papers of various types (supercalendered, coated, etc.), cardboards, cellulose sheets, metal sheets, plastic films (polyester, polyethylene, polypropylene, etc.).

The amounts of compositions deposited are of the order of 0.5 to 2 g per m² of area to be treated, which corresponds to the deposition of layers of the order of 0.5 to 2 μm.

The materials or supports thus coated can subsequently be brought into contact with any pressure-sensitive rubber, acrylic or other adhesive materials. The adhesive material is then easily detachable from said support or material.

According to another of its subjects, the invention is also directed toward a support, characterized in that it comprises at least one water-repellent release coating obtained according to the process according to the invention and as described above or from silicone composition A according to the invention and as described above.

Preferably, the support is a flexible support chosen from the group consisting of a paper, a polymer film of polyolefin, polypropylene, polyethylene or polyester type, and a polymer film for protecting the adhesive face of a self-adhesive element or pressure-sensitive adhesive element.

Even more preferentially, the support is a polyester polymer film.

The silicone release coatings according to the invention are well and durably attached to the flexible supports, even under drastic humidity and temperature conditions, and on prolonged contact with an acrylic adhesive. They are crosslinked/cured (few extractable compounds). They have a release force profile such that the peeling force remains high even at high speed (good release). They are smooth and transparent, which ultimately makes them effective label supports.

The following examples are given by way of indication and cannot be considered to limit the field and spirit of the invention.

EXAMPLES

I—Preparation of the Attachment Additives:
Various additives were synthesized, consisting of:
  n YCH$_3$SiO$_{2/2}$ units
  m HCH$_3$SiO$_{2/2}$ units
  p (CH$_3$)$_2$SiO$_{2/2}$ units
  2 (CH$_3$)$_3$Si$_{1/2}$ units
  wherein Y is the epoxy group of formula below

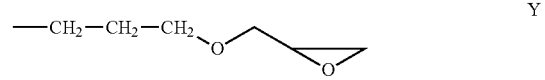

Additive I1
181.0 g of toluene are introduced, under nitrogen, into a 1 l reactor. The medium is stirred and heated to 85° C. When the temperature is reached, 10.2 mg of a platinum-carbene complex, sold by Umicore under the trade name1 Umicore HS432®, are introduced. A mixture of allyl glycidyl ether (AGE) (236.8 g, 2.07 mol) and of a polymethylhydrosiloxane H2 with 9 (CH$_3$)HSiO$_{2/2}$ units and two (CH$_3$)$_3$SiO$_{1/2}$ end units (363.2 g, SiH=4.77 mol) is then added dropwise over the course of 4 hours. After returning to ambient temperature, the reaction medium is devolatilized at 25-30° C. under 0-3 mbar for 30 min, then at 85° C. (setpoint) under 1 mbar for 3 h, to give a functionalized silicone oil composed of n YCH$_3$SiO$_{2/2}$ units, m HCH$_3$SiO$_{2/2}$ units and two (CH$_3$)$_3$Si$_{1/2}$ units with the following characteristics: n+m=9; [SiH]=586 mmol/100 g; [Epoxy]=291 mmol/100 g; Viscosity=32 mPa·s.

Additive I2
50.3 g of toluene and 472 mg of Pt/C are introduced, under nitrogen, into a 500 ml round-bottomed flask. This mixture is magnetically stirred and heated to 90° C. A mixture of allyl glycidyl ether (AGE) (46.4 g, 0.40 mol) and of a polymethylhydrosiloxane H2 with 9 (CH$_3$)HSiO$_{2/2}$ units and two (CH$_3$)$_3$SiO$_{1/2}$ end units (100.22 g, SiH=1.35 mol) is added dropwise over the course of 47.5 min. When the addition has ended, the heating is maintained overnight. After returning to ambient temperature, the reaction medium is filtered through cardboard and Teflon, then treated with 2S black at 60° C. for 6 h and then again filtered. The treatment with the black is repeated. The reaction medium is then devolatilized at 80° C. (setpoint) under 1 mbar for 3 h, to give a functionalized silicone oil composed of n YCH$_3$SiO$_{2/2}$ units, m HCH$_3$SiO$_{2/2}$ units and two (CH$_3$)$_3$Si$_{1/2}$ units with the following characteristics: n+m=9, [SiH]=720 mmol/100 g; [Epoxy]=219 mmol/100 g; Viscosity=27 mPa·s.

Additive I3

105.1 g of toluene and 11 g of a platinum-carbene complex, sold by Umicore under the trade name Umicore HS432®, are introduced, under nitrogen, into a 500 ml round-bottomed flask. This mixture is magnetically stirred and heated to 85° C. A mixture of allyl glycidyl ether (AGE) (249.2 g, 2.18 mol) and of polymethylhydrosiloxane H3 comprising 20 $(CH_3)HSiO_{2/2}$ units and two $(CH_3)_3SiO_{1/2}$ end units (302.6 g, SiH=4.52 mol) is added dropwise over the course of 3 hours. When the addition has ended, the dropping funnel is rinsed with 45.4 g of toluene and the heating is maintained for 2 hours. After returning to ambient temperature, the reaction medium is devolatilized at 92° C. under 1 mbar for 3 hours, to give a functionalized silicone oil (449.0 g) composed of n $YCH_3SiO_{2/2}$ units, m $HCH_3SiO_{2/2}$ units and two $(CH_3)_3Si_{1/2}$ units with the following characteristics: n+m=20, [SiH]=568 mmol/100 g; [Epoxy]=324.3 mmol/100 g; Viscosity=186 mPa·s.

Additive C1

200 g of toluene and 1.80 g of Pt/C (1.5% by weight of platinum) are introduced into a 1 l reactor. This mixture is stirred and heated to 80° C. A mixture of allyl glycidyl ether (AGE) (53 g, 0.465 mol) and of polymethylhydrosiloxane H4 with 4 $(CH_3)HSiO_{2/2}$ units, 9 $(CH_3)_2SiO_{2/2}$ units and two $(CH_3)_3SiO_{1/2}$ end units (500 g, SiH=1.75 mol) is added dropwise over the course of half an hour. When the addition has ended, the heating is maintained for 1 hour. The heating is then stopped and, after returning to ambient temperature, the reaction medium is filtered in order to remove the Pt/C. Finally, the reaction medium is devolatilized at 80° C. under 10 mbar for 3 hours, to give a functionalized silicone oil (516 g—Yield: 93%) composed of n $YCH_3SiO_{2/2}$ units, m $HCH_3SiO_{2/2}$ units, 9 $(CH_3)_2SiO_{2/2}$ units and two $(CH_3)_3Si_{1/2}$ units with the following characteristics: n+m=4, [SiH]=0.25 mol/100 g; [Epoxy]=75 mmol/100 g; Viscosity=13 mPa·s.

Additive C2

200 g of toluene and 1.80 g of Pt/C (1.5% by weight of platinum) are introduced into a 1 l reactor. This mixture is stirred and heated to 80° C. A mixture of allyl glycidyl ether (AGE) (159 g, 1.395 mol) and of polymethylhydrosiloxane H4 with 4 $(CH_3)HSiO_{2/2}$ units, 9 $(CH_3)_2SiO_{2/2}$ units and two $(CH_3)_3SiO_{1/2}$ end units (500 g, SiH=1.75 mol) is added dropwise over the course of half an hour. When the addition has ended, the heating is maintained for 1 hour. The heating is then stopped and, after returning to ambient temperature, the reaction medium is filtered in order to remove the Pt/C. Finally, the reaction medium is devolatilized at 80° C. under 10 mbar for 3 hours, to give a functionalized silicone oil (599 g—Yield: 91%) composed of n $YCH_3SiO_{2/2}$ units, m $HCH_3SiO_{2/2}$ units, 9 $(CH_3)_2SiO_{2/2}$ units and two $(CH_3)_3Si_{1/2}$ units with the following characteristics: n+m=4, [SiH]=0.097 mol/100 g; [Epoxy]=188 mmol/100 g; Viscosity=25 mPa·s.

Additive C3

200 g of toluene and 1.80 g of Pt/C (1.5% by weight of platinum) are introduced into a 1 l reactor. This mixture is stirred and heated to 80° C. A mixture of allyl glycidyl ether (AGE) (75 g, 0.657 mol) and of polymethylhydrosiloxane H6 with 50 $(CH_3)HSiO_{2/2}$ units, 50 $(CH_3)_2SiO_{2/2}$ units and two $(CH_3)_3SiO_{1/2}$ end units (500 g, SiH=3.65 mol) is added dropwise over the course of half an hour. When the addition has ended, the heating is maintained for 1 hour. The heating is then stopped and, after returning to ambient temperature, the reaction medium is filtered in order to remove the Pt/C. Finally, the reaction medium is devolatilized at 80° C. under 10 mbar for 3 hours, to give a functionalized silicone oil (518 g—Yield: 90%) composed of n $YCH_3SiO_{2/2}$ units, m $HCH_3SiO_{2/2}$ units, 50 $(CH_3)_2SiO_{2/2}$ units and two $(CH_3)_3Si_{1/2}$ units with the following characteristics: n+m=50, [SiH]=0.55 mol/100 g; [Epoxy]=76 mmol/100 g; Viscosity=250 mPa·s.

Additive C4

1733.9 g of toluene and 2.7 g of Pt—NHC in solution in toluene are introduced, under nitrogen, into a 10 l reactor. This mixture is stirred and heated to 77° C. A mixture of allyl glycidyl ether (AGE) (390.5 g, 3.42 mol) and of polymethylhydrosiloxane H3 comprising 20 $(CH_3)HSiO_{2/2}$ units and two $(CH_3)_3SiO_{1/2}$ end units (5599.5 g, SiH=82.23 mol) is added by means of a pump over the course of 54 min. When the addition has ended, the heating is maintained for 1 hour. The heating is then stopped and, after returning to ambient temperature, the reaction medium is devolatilized at 40° C. under 5 mbar for 1 hour and then the temperature is gradually increased up to 85° C. over the course of 4 h. The temperature is maintained at 85° C. for 1 hour, to give a functionalized silicone oil (7727.8 g) composed of n $YCH_3SiO_{2/2}$ units, m $HCH_3SiO_{2/2}$ units and two $(CH_3)_3Si_{1/2}$ units with the following characteristics: n+m=20, [SiH]=1.30 mol/100 g; [Epoxy]=37.7 mmol/100 g; Viscosity=12.3 mPa·s.

Additive C5

75.3 g of toluene and 645 mg of 1.56% 2S black are introduced, under nitrogen, into a 500 ml round-bottomed flask. This mixture is magnetically stirred and heated to 90° C. A mixture of allyl glycidyl ether (AGE) (47.8 g, 0.42 mol) and of polymethylhydrosiloxane H5 with 10 $(CH_3)HSiO_{2/2}$ units, 10 $(CH_3)_2SiO_{2/2}$ units and two $(CH_3)_3SiO_{1/2}$ end units (150.6 g, SiH=1.0 mol) is added dropwise over the course of 32 min. When the addition has finished, the heating is maintained for 2 h. After cooling, the medium is filtered through cardboard and Teflon. The crude product is then treated with 2S black at 60° C. overnight and then again filtered. The reaction medium is then devolatilized at 30° C. under 4 mbar for 3 hours, then at 80° C. (setpoint) under 4 mbar for 4 h, to give a functionalized silicone oil (169.2 g) composed of n $YCH_3SiO_{2/2}$ units, m $HCH_3SiO_{2/2}$ units, 10 $(CH_3)_2SiO_{2/2}$ units and two $(CH_3)_3Si_{1/2}$ units with the following characteristics: n+m=10, [SiH]=326.6 mmol/100 g; [Epoxy]=180.8 mmol/100 g; Viscosity=46.6 mPa·s.

Additive C6

51.3 g of toluene and 398 mg of Pt/C are introduced, under nitrogen, into a 500 ml round-bottomed flask. This mixture is magnetically stirred and heated to 90° C. A mixture of allyl glycidyl ether (AGE) (23.1 g, 0.20 mol) and of polymethylhydrosiloxane H2 (100.40 g, SiH=1.35 mol) is added dropwise over the course of 20.25 min. When the addition has finished, the heating is reduced to 60° C. and the medium is filtered through cardboard and Teflon. The crude product is then treated with 4S black at 60° C. for 7 h and then again filtered. The reaction medium is then devolatilized at 30° C. under 10 mbar for 2 h and then at 80° C. (setpoint) under 1 mbar for 2 h, to give a functionalized silicone oil composed of n $YCH_3SiO_{2/2}$ units, m $HCH_3SiO_{2/2}$ units and two $(CH_3)_3Si_{1/2}$ units with the following characteristics: n+m=9, [SiH]=962 mmol/100 g; [Epoxy]=116 mmol/100 g; Viscosity=12 mPa·s.

TABLE 1

Summary of the attachment additives:

| Attachment additive | Total number of siloxyl units | Number of $(CH_3)_2SiO_{2/2}$ units | [SiH] mmol/ 100 g | [Epoxy] mmol/ 100 g | [SiH]/ [Epoxy] |
|---|---|---|---|---|---|
| I1 Invention | 11 | 0 | 586 | 291 | 2.0 |
| I2 Invention | 11 | 0 | 720 | 219 | 3.3 |

TABLE 1-continued

Summary of the attachment additives:

| Attachment additive | Total number of siloxyl units | Number of $(CH_3)_2SiO_{2/2}$ units | [SiH] mmol/ 100 g | [Epoxy] mmol/ 100 g | [SiH]/ [Epoxy] |
|---|---|---|---|---|---|
| I3 Invention | 22 | 0 | 568 | 324 | 1.8 |
| C1 Comparative example | 15 | 9 | 250 | 75 | 3.3 |
| C2 Comparative example | 15 | 9 | 97 | 188 | 0.5 |
| C3 Comparative example | 102 | 50 | 550 | 76 | 7.2 |
| C4 Comparative example | 22 | 0 | 1300 | 38 | 34.2 |
| C5 Comparative example | 22 | 10 | 326 | 180 | 1.8 |
| C6 Comparative example | 11 | 0 | 962 | 116 | 8.3 |

II—Application Tests—Conditions for Coating and Crosslinking with the Attachment Additives:

All the coatings were carried out on a Rotomec 5-roll coating machine, with crosslinking of the silicone deposited on a PET film support or a glassine paper support with a deposit of between 0.3 and 1 g/m².

Once out of the coating machine, the siliconized film or paper is subjected to testing of the adhesion and abrasion resistance of the coating according to the rub-off test described below, and also the content of extractable compounds (non-crosslinked silicone fraction) which makes it possible to characterize the reactivity of the system.

An aging test is then carried out, which consists in placing the siliconized paper or film in contact with an acrylic adhesive in a climatic oven at 50° C./70% relative humidity (accelerated aging) in order to monitor the change in abrasion resistance over time.

The silicone fraction extractable with MIBK (methyl isobutyl ketone), that is to say the amount of non-crosslinked silicone, is determined by atomic absorption by quantitatively determining the silicon in the extraction solvent.

The rub-off measurement for verifying the adhesion to the support and the abrasion resistance of the silicone layer consists in rubbing the index finger on the siliconized support in order to apply mechanical stresses to the layer. The number of times the finger is moved back and forth until the rub-off (scrubbing) phenomenon appears, corresponding to the tearing of the silicone coating into shreds, is noted. The grade 1 indicates a poor abrasion resistance of the silicone layer and the grade 10 indicates an excellent abrasion resistance of the silicone layer.

The results are given in detail in the following tables 2 to 10.

TABLE 2

Toray PET 6040 Film - Ovens 180° C. -Speed 100 m/min

| | Invention | Invention | Comparative example | Comparative example |
|---|---|---|---|---|
| Coated silicone composition (in parts by weight) | | | | |
| Chain middle vinylated oil viscosity 350 mPa · s | 100 | 100 | 100 | 100 |
| Crosslinking silicone oil $MD'_{50}M$ | 6.9 | 6.5 | 6.7 | 7.1 |
| Additive | I1 | I1 | C3 | C3 |
|  | 1 | 2 | 1 | 2 |
| [SiH]/[SiVinyl] unit molar ratio | 3 | 3 | 3 | 3 |
| Pt catalyst (ppm) | 120 | 120 | 120 | 120 |
| Test results for adhesion and abrasion resistance | | | | |
| Extractable compounds (%) | 4.2 | 3.5 | 4.1 | 3.8 |
| Rub-Off on leaving machine | 10 | 10 | 10 | 10 |
| Rub-Off after 3 days at 50° C. and 70% humidity | 10 | 10 | 10 | 10 |
| Rub-Off after 7 days at 50° C. and 70% humidity | 10 | 10 | 10 | 10 |
| Rub-Off after 14 days at 50° C. and 70% humidity | 10 | 10 | 5 | 5 |
| Rub-Off after 42 days at 50° C. and 70% humidity | 10 | 10 | 4 | 4 |
| Rub-Off after 70 days at 50° C. and 70% humidity | 10 | 10 | 2 | 2 |
| Rub-Off after 160 days at 50° C. and 70% humidity | 10 | 10 | 1 | 1 |

The PET films coated with a composition according to the invention with the additive I1 exhibit good abrasion resistance measured by the rub-off test even after 160 days of storage at 50° C. and 70% relative humidity.

The comparative tests carried out with the additive C3 with 102 siloxyl units, including 50 $(CH_3)_2SiO_{2/2}$ units, exhibit poor abrasion resistance after 14 days at 50° C. and 70% relative humidity.

TABLE 3

Toray PET 6040 Film - Ovens 180° C. -Speed 100 m/min

| | Invention | Invention | Comparative example | Comparative example |
|---|---|---|---|---|
| Coated silicone composition (in parts by weight) | | | | |
| Chain middle vinylated oil viscosity 350 mPa · s | 100 | 100 | 100 | 100 |
| Crosslinking silicone oil $MD'_{50}M$ | 6.7 | 6.6 | 6.7 | 7.1 |
| Additive | I1 | I1 | C1 | C1 |
|  | 0.5 | 1 | 1.8 | 3.6 |
| [SiH]/[SiVinyl] unit molar ratio | 3 | 3 | 3 | 3 |
| Pt catalyst (ppm) | 120 | 120 | 120 | 120 |
| Test results for adhesion and abrasion resistance | | | | |
| Extractable compounds (%) | Not measured | Not measured | Not measured | Not measured |
| Rub-Off on leaving machine | 10 | 10 | 10 | 10 |
| Rub-Off after 5 days at 50° C. and 70% humidity | 10 | 10 | 10 | 10 |
| Rub-Off after 7 days at 50° C. and 70% humidity | 10 | 10 | 2 | 1 |
| Rub-Off after 15 days at 50° C. and 70% humidity | 10 | 10 | 1 | 1 |
| Rub-Off after 30 days at 50° C. and 70% humidity | 10 | 10 | 1 | 1 |

The PET films coated with a composition according to the invention with 0.5 or 1 part by weight of additive I1 exhibit good abrasion resistance measured by the rub-off test even after 30 days of storage at 50° C. and 70% relative humidity.

The comparative tests carried out with the additive C1 with 9 $(CH_3)_2SiO_{2/2}$ units, an epoxy content of less than 0.2 mol/100 g and an SiH content of less than 0.3 mol/100 g of additive exhibit poor abrasion resistance after 7 days at 50° C. and 70% relative humidity.

TABLE 4

Toray PET 6040 Film - Ovens 180° C. -Speed 100 m/min

|  | Invention | Invention | Comparative example | Comparative example |
|---|---|---|---|---|
| Coated silicone composition (in parts by weight) | | | | |
| Chain middle vinylated oil viscosity 350 mPa · s | 100 | 100 | 100 | 100 |
| Crosslinking silicone oil MD'$_{50}$M | 6.7 | 6.5 | 6.5 | 5.7 |
| Additive | I1 | I2 | C6 | C6 |
|  | 1 | 1.2 | 1 | 2.3 |
| [SiH]/[SiVinyl] unit molar ratio | 3 | 3 | 3 | 3 |
| Pt catalyst (ppm) | 120 | 120 | 120 | 120 |
| Test results for adhesion and abrasion resistance | | | | |
| Extractable compounds (%) | 4.9 | 3.5 | 4.8 | 3.9 |
| Rub-Off on leaving machine | 10 | 10 | 10 | 10 |
| Rub-Off after 3 days at 50° C. and 70% humidity | 10 | 10 | 10 | 10 |
| Rub-Off after 14 days at 50° C. and 70% humidity | 10 | 10 | 8 | 10 |
| Rub-Off after 28 days at 50° C. and 70% humidity | 10 | 10 | 3 | 10 |
| Rub-Off after 42 days at 50° C. and 70% humidity | 10 | 10 | 3 | 10 |
| Rub-Off after 60 days at 50° C. and 70% humidity | 10 | 10 | 1 | 10 |
| Rub-Off after 125 days at 50° C. and 70% humidity | 10 | 10 | 1 | 3 |

The PET films coated with the compositions according to the invention with the additive I1 or I2 exhibit good abrasion resistance measured by the rub-off test even after 125 days of storage at 50° C. and 70% relative humidity.

The comparative tests carried out with the additive C6 with an epoxy content of less than 0.2 mol/100 g exhibit poor abrasion resistance after 14 days at 50° C. and 70% relative humidity (one part of additive) or after 125 days of storage at 50° C. and 70% relative humidity.

TABLE 5

JINDAL PET Film - Ovens 180° C. -Speed 100 m/min

|  | Invention | Invention | Comparative example | Comparative example |
|---|---|---|---|---|
| Coated silicone composition (in parts by weight) | | | | |
| Mixture of chain middle vinylated oil and chain middle and end vinylated oil, viscosity 600 mPa · s | 100 | 100 | 100 | 100 |
| Crosslinking silicone oil MD'$_{50}$M | 10 | 9.85 | 9.8 | 9.4 |
| Additive | I1 | I1 | C4 | C4 |
|  | 0.5 | 1 | 0.5 | 1 |
| [SiH]/[SiVinyl] unit molar ratio | 2.2 | 2.2 | 2.2 | 2.2 |
| Pt catalyst (ppm) | 100 | 100 | 100 | 100 |
| Test results for adhesion and abrasion resistance | | | | |
| Extractable compounds (%) | 2.5 | 2.7 | 3.2 | 2.3 |
| Rub-Off on leaving machine | 10 | 10 | 10 | 10 |

TABLE 5-continued

JINDAL PET Film - Ovens 180° C. -Speed 100 m/min

|  | Invention | Invention | Comparative example | Comparative example |
|---|---|---|---|---|
| Rub-Off after 10 days at 50° C. and 70% humidity | 10 | 10 | 10 | 10 |
| Rub-Off after 36 days at 50° C. and 70% humidity | 10 | 10 | 2 | 10 |
| Rub-Off after 52 days at 50° C. and 70% humidity | 10 | 10 | 1 | 7 |
| Rub-Off after 76 days at 50° C. and 70% humidity | 10 | 10 | 1 | 8 |
| Rub-Off after 87 days at 50° C. and 70% humidity | 10 | 10 | 1 | 3 |

The PET films coated with the compositions according to the invention with the additive I1 exhibit good abrasion resistance measured by the rub-off test even after 87 days of storage at 50° C. and 70% relative humidity.

The comparative tests carried out with the additive C4 with an epoxy content of less than 0.2 mol/100 g exhibit poor abrasion resistance after 36 days at 50° C. and 70% relative humidity (0.5 part of additive C4) or after 52 days of storage at 50° C. and 70% relative humidity (1 part of additive C4).

TABLE 6

JINDAL PET Film - Ovens 180° C. -Speed 20 m/min

|  | Invention | Comparative example |
|---|---|---|
| Coated silicone composition (in parts by weight) | | |
| Mixture of chain middle vinylated oil and chain middle and end vinylated oil, viscosity 600 mPa · s | 100 | 100 |
| Crosslinking silicone oil MD'$_{50}$M | 9.6 | 6.65 |
| Additive | I1 | C4 |
|  | 2 | 2 |
| [SiH]/[SiVinyl] unit molar ratio | 2.2 | 2.2 |
| Pt catalyst (ppm) | 120 | 120 |
| Test results for adhesion and abrasion resistance | | |
| Extractable compounds (%) | 3.2 | 4.4 |
| Rub-Off on leaving machine | 10 | 10 |
| Rub-Off after 4 days at 50° C. and 70% humidity | 10 | 10 |
| Rub-Off after 10 days at 50° C. and 70% humidity | 10 | 5 |
| Rub-Off after 17 days at 50° C. and 70% humidity | 10 | 5 |
| Rub-Off after 25 days at 50° C. and 70% humidity | 10 | 2 |

The PET films coated with the composition according to the invention with the additive I1 exhibit good abrasion resistance measured by the rub-off test even after 25 days of storage at 50° C. and 70% relative humidity.

The comparative tests carried out with the additive C4 with an epoxy content of less than 0.2 mol/100 g exhibit poor abrasion resistance after 10 days at 50° C. and 70% relative humidity.

TABLE 7

Glassine Paper H53- Ovens 140° C.- Speed 80 m/min

|  | Invention | Comparative example | Comparative example |
|---|---|---|---|
| Coated silicone composition (in parts by weight) | | | |
| Chain middle and end vinylated oil viscosity 300 mPa · s | 100 | 100 | 100 |
| Adhesion modulator | 5 | 5 | 5 |
| Crosslinking silicone oils Mixture of MD'$_{50}$M and MD'$_{50}$D$_{50}$M | 6.9 | 6.7 | 6.2 |
| Additive | I1 0.5 | C1 1.8 | C2 0.72 |
| [SiH]/[SiVinyl] unit molar ratio | 2 | 2 | 2 |
| Pt catalyst (ppm) | 35 | 35 | 35 |
| Test results for adhesion and abrasion resistance | | | |
| Extractable compounds (%) | 8.2 | 8.2 | 6.3 |
| Rub-Off on leaving machine | 10 | 10 | 10 |
| Rub-Off after 14 days at 50° C. and 70% humidity | 10 | 10 | 3 |
| Rub-Off after 56 days at 50° C. and 70% humidity | 10 | 7 | 2 |
| Rub-Off after 70 days at 50° C. and 70% humidity | 10 | 1 | 1 |

The Glassine paper coated with the compositions according to the invention with the additive I1 exhibits good abrasion resistance measured by the rub-off test even after 70 days of storage at 50° C. and 70% relative humidity.

The comparative tests carried out with the additives C1 and C2 with 9 (CH$_3$)$_2$SiO$_{2/2}$ units, an epoxy content of less than 0.2 mol/100 g and an SiH content of less than 0.3 mol/100 g exhibit poor abrasion resistance after 56 days at 50° C. and 70% relative humidity (additive C1) or after 14 days of storage at 50° C. and 70% relative humidity (additive C2).

TABLE 8

Glassine Paper H53- Ovens 140° C.- Speed 100 m/min

|  | Invention | Comparative example |
|---|---|---|
| Coated silicone composition (in parts by weight) | | |
| Chain middle and end vinylated oil viscosity 300 mPa · s | 95 | 95 |
| Adhesion modulator | 5 | 5 |
| Crosslinking silicone oils Mixture of MD'50M and MD'50D50M | 6.9 | 6.9 |
| Additive | I1 0.5 | C5 0.75 |
| [SiH]/[SiVinyl] unit molar ratio | 2 | 2 |
| Pt catalyst (ppm) | 35 | 35 |
| Test results for adhesion and abrasion resistance | | |
| Extractable compounds (%) | Not measured | Not measured |
| Rub-Off on leaving machine | 10 | 10 |
| Rub-Off after 7 days at 50° C. and 70% humidity | 10 | 1 |
| Rub-Off after 15 days at 50° C. and 70% humidity | 10 | 1 |
| Rub-Off after 21 days at 50° C. and 70% humidity | 10 | 1 |
| Rub-Off after 70 days at 50° C. and 70% humidity | 10 | 1 |

The Glassine paper coated with the composition according to the invention with the additive I1 exhibits good abrasion resistance measured by the rub-off test even after 70 days of storage at 50° C. and 70% relative humidity.

The comparative test carried out with the additive C5 with 9 (CH$_3$)$_2$SiO$_{2/2}$ units and an epoxy content of less than 0.2 mol/100 g exhibits poor abrasion resistance after 70 days at 50° C. and 70% relative humidity.

All of the results presented in the tables above show that only the attachment additives I1, I2 and I3 according to the invention make it possible to obtain satisfactory results during rub-off measurements carried out in order to measure the adhesion of the silicone layer on the paper support or PET film support and the abrasion resistance.

TABLE 9

Toray PET 6040 Film - Ovens 180° C. -Speed 100 m/min

|  | Invention | Invention | Invention | Invention |
|---|---|---|---|---|
| Coated silicone composition (in parts by weight) | | | | |
| Chain middle vinylated oil viscosity 350 mPa · s | 100 | 100 | 100 | 100 |
| Crosslinking silicone oil MD'$_{50}$M | 6.7 | 6.7 | 6.7 | 6.7 |
| Additive I1 | 1 | 1 | 1 | 1 |
| [SiH]/[SiVinyl] unit molar ratio | 3 | 3 | 3 | 3 |
| Pt catalyst (ppm) | 120 | 90 | 60 | 40 |
| Test results for adhesion and abrasion resistance | | | | |
| Extractable compounds (%) | Not measured | Not measured | Not measured | Not measured |
| Rub-Off on leaving machine | 10 | 10 | 10 | 10 |
| Rub-Off after 3 days at 50° C. and 70% humidity | 10 | 10 | 10 | 10 |
| Rub-Off after 7 days at 50° C. and 70% humidity | 10 | 10 | 10 | 10 |
| Rub-Off after 21 days at 50° C. and 70% humidity | 10 | 10 | 10 | 10 |

This series of tests shows that, when an additive according to the invention is used in the silicone coating composition, the amount of platinum catalyst used can be reduced without degrading either the crosslinking kinetics (speed unchanged) or the abrasion resistance.

TABLE 10

Toray PET 6040 - Ovens 180° C. -Speed 100 m/min

|  | Invention | Invention |
|---|---|---|
| Coated silicone composition (in parts by weight) | | |
| Chain middle vinylated oil viscosity 350 mPa · s | 100 | 100 |

TABLE 10-continued

Toray PET 6040 - Ovens 180° C. -Speed 100 m/min

|  | Invention | Invention |
|---|---|---|
| Crosslinking silicone oil MD′₅₀M | 4.5 | 0 |
| Additive I1 | 1 | 6 |
| [SiH]/[SiVinyl] unit molar ratio | 2 | 2 |
| Pt catalyst (ppm) | 120 | 120 |
| Test results for adhesion and abrasion resistance |  |  |
| Rub-Off on leaving machine | 10 | 10 |
| Rub-Off after 3 days at 50° C. and 70% humidity | 10 | 10 |
| Rub-Off after 7 days at 50° C. and 70% humidity | 10 | 10 |
| Rub-Off after 21 days at 50° C. and 70% humidity | 10 | 10 |

By increasing the amount of additive according to the invention in the coating composition, it can completely replace the crosslinking oil.

The invention claimed is:

1. A silicone composition A comprising a silicone base B capable of crosslinking or curing by polyaddition and comprising at least one additive X which is a linear organopolysiloxane comprising siloxyl units (I.1) to (I.3) having the formulae below:

$$Y_a Z_b^1 SiO_{\frac{4-(a+b)}{2}} \quad (I.1)$$

$$Z_3^2 SiO_{\frac{1}{2}} \quad (I.2)$$

$$H_d Z_e^3 SiO_{\frac{4-(d+e)}{2}} \quad (I.3)$$

and not comprising units of formula (I.4):

$$Z_2^2 SiO_{2/2} \quad (I.4)$$

in which
a=1 and b=1 or 2,
d=1 and e=1,
Y is

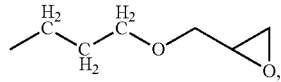

the symbols $Z^1$, $Z^2$ and $Z^3$, which may be identical or different, are chosen from the group formed by alkyl groups containing from 1 to 8 carbon atoms and aryl groups containing from 6 to 12 carbon atoms,
with the following conditions:
the additive X comprises, per molecule, at least two siloxyl units (I.1) bearing Y, at least three siloxyl units (I.3) bearing hydrosiloxyl groups and a total number N of siloxyl units of between 7 and 30,
the additive X has a content of siloxyl units (I.1) of greater than or equal to 0.2 mol per 100 g of additive X, and
the additive X does not comprise any functional group selected from the group consisting of an alkoxy, vinyl, hydroxyl, and methacryloxy functional groups.

2. The silicone composition A as claimed in claim 1, wherein the additive X has a content of siloxyl units (I.1) of greater than or equal to 0.2 mol per 100 g of additive X and a content of siloxyl units (I.3) of greater than or equal to 0.3 mol per 100 g of additive X.

3. The silicone composition A as claimed in claim 1, wherein the additive X has a number N1 of siloxyl units (I.1) and a number N3 of siloxyl units (I.3) which satisfy the following conditions:
2≤N1≤10, and
3≤N3≤20.

4. The silicone composition A as claimed in claim 1, wherein the additive X has a total number N of siloxyl units of between 7 and 25, limits inclusive.

5. The silicone composition A as claimed in claim 1, wherein the content of additive X is between 0.3% and 10% by weight relative to the total weight of the composition A.

6. The silicone composition A as claimed in claim 1, wherein the silicone base B comprises:
(A) at least one alkenylated organopolysiloxane E comprising at least two siloxyl units (I.5) having the formula below:

$$W_a Z_b SiO_{\frac{4-(a+b)}{2}} \quad (I.5)$$

in which:
a=1 or 2, b=0, 1 or 2, and a+b=1, 2 or 3;
W independently represents an alkenyl group, and
Z independently represents a monovalent hydrocarbon-based group containing from 1 to 30 carbon atoms, and
(B) at least one polyaddition catalyst F.

7. The silicone composition A as claimed in claim 1, wherein the amounts of constituents are such that a [≡SiH]/[≡SiAlkenyl] molar ratio is between 1 and 7, wherein:
[≡SiH]=total number of moles of siloxyl units comprising a hydrogen atom bonded to the silicon within the silicone composition A, and
[≡SiAlkenyl]=total number of moles of siloxyl units comprising an alkenyl radical bonded to the silicon within the silicone composition A.

8. The silicone composition A as claimed in claim 1, wherein the additive X has a dynamic viscosity at 25° C. of between 10 and 700 mPa·s.

* * * * *